Jan. 13, 1959 R. C. BOUCHER 2,868,252
APPARATUS FOR AND PROCESS OF REMOVING SKINS FROM TOMATOES
Filed Dec. 20, 1955 4 Sheets-Sheet 1
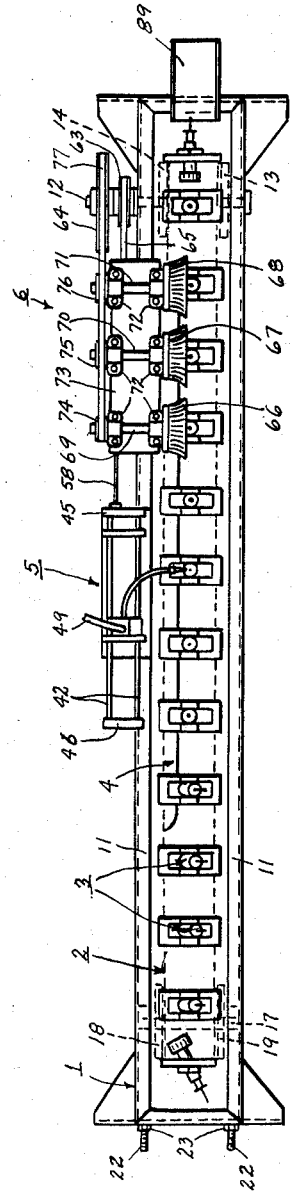
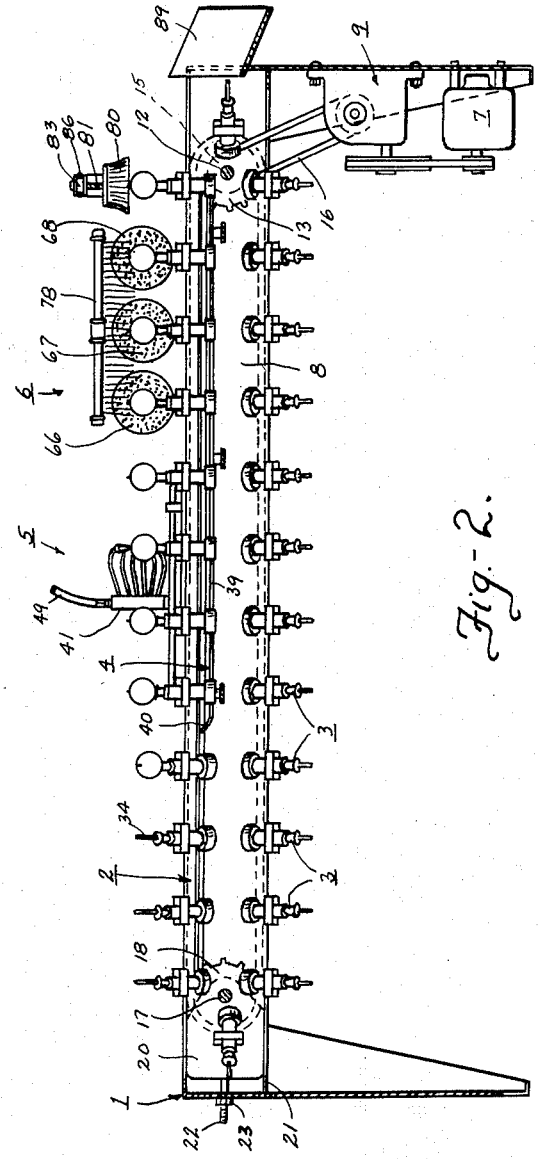
INVENTOR.
Richard C. Boucher
BY
Charles S. Penfold
ATTORNEY Jan. 13, 1959 R. C. BOUCHER 2,868,252
APPARATUS FOR AND PROCESS OF REMOVING SKINS FROM TOMATOES
Filed Dec. 20, 1955 4 Sheets-Sheet 2
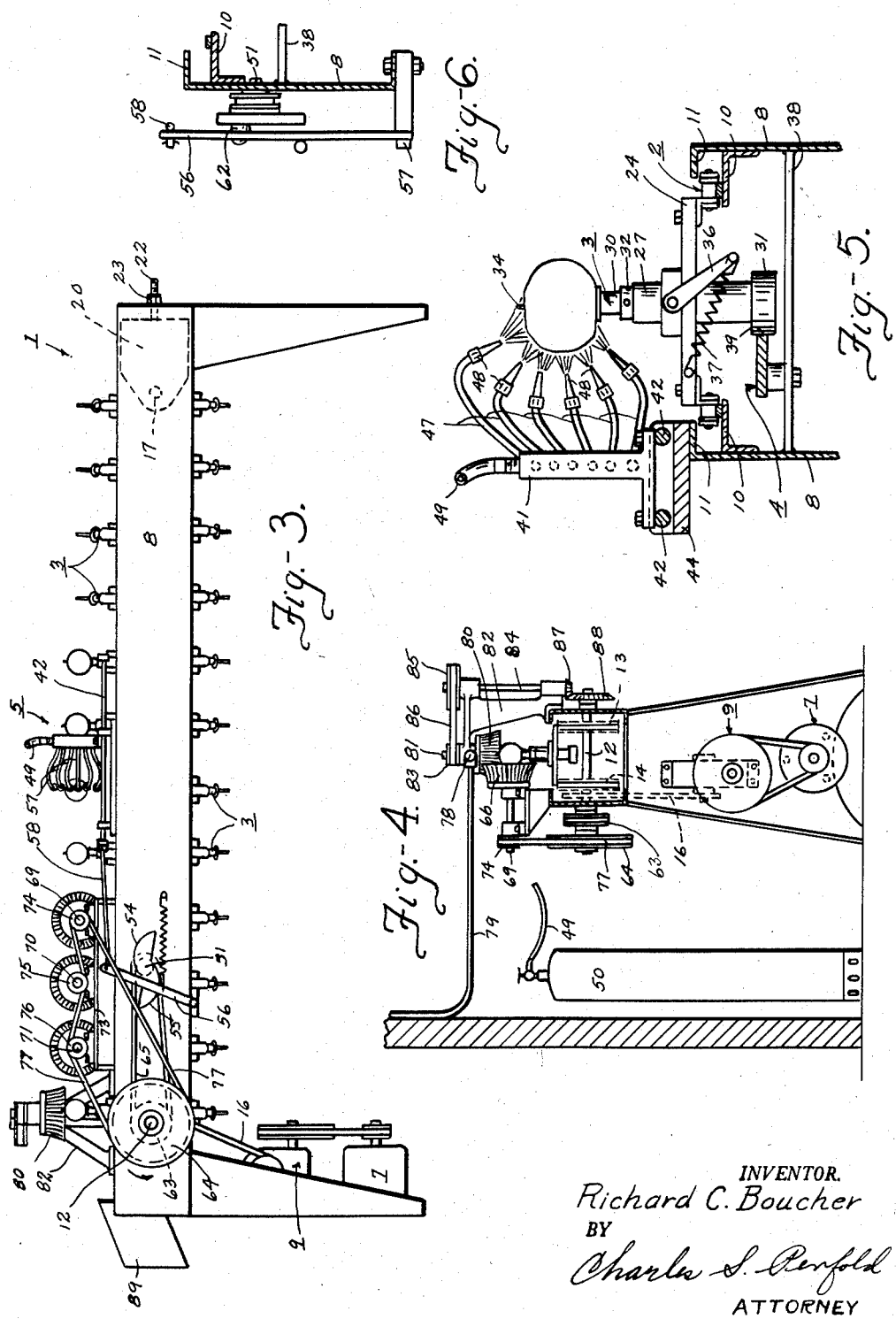
INVENTOR.
Richard C. Boucher
BY
Charles S. Renfold
ATTORNEY

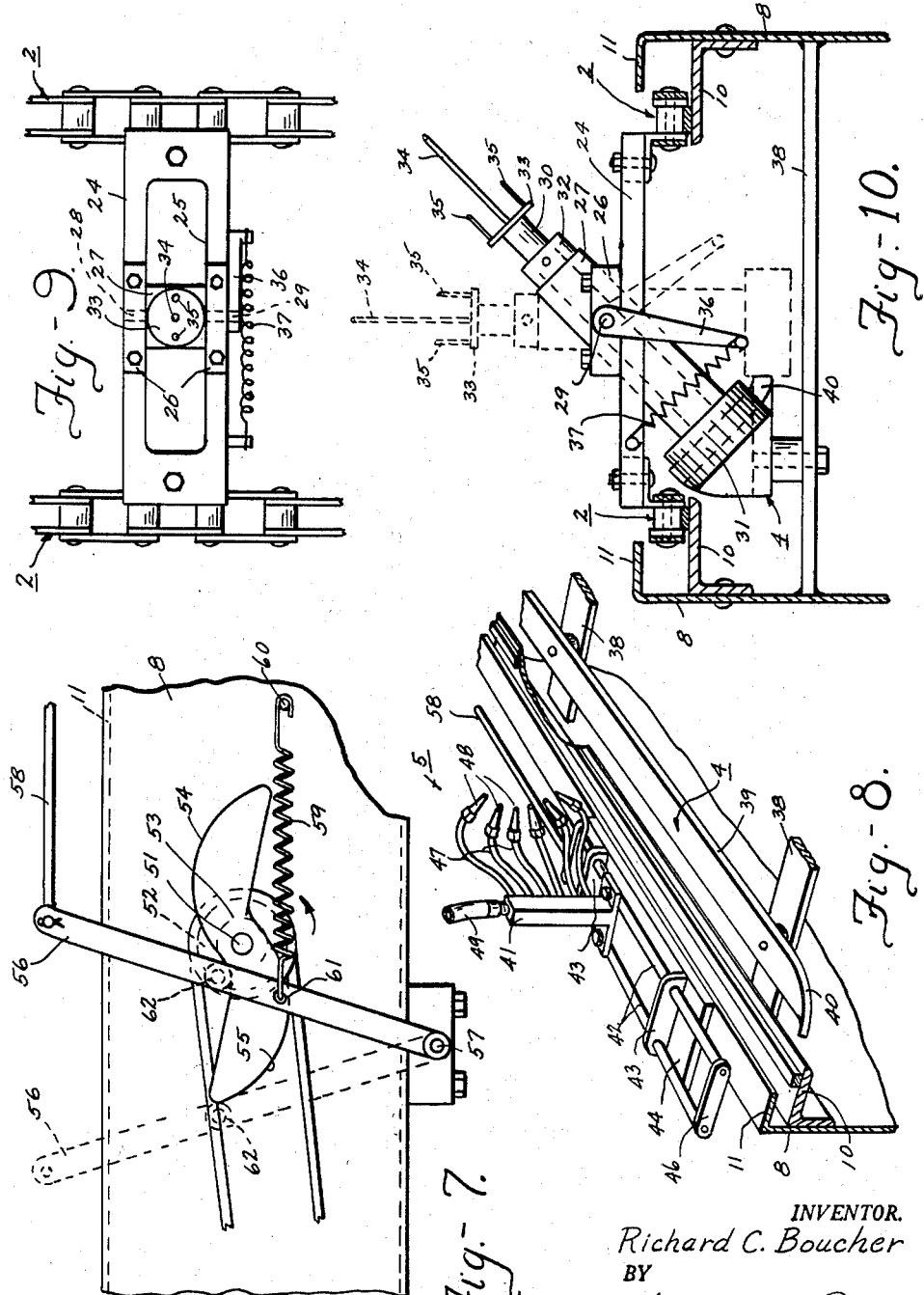

Jan. 13, 1959 R. C. BOUCHER 2,868,252
APPARATUS FOR AND PROCESS OF REMOVING SKINS FROM TOMATOES
Filed Dec. 20, 1955 4 Sheets-Sheet 4

INVENTOR.
Richard C. Boucher
BY
Charles S. Penfold
ATTORNEY

United States Patent Office 2,868,252
Patented Jan. 13, 1959

2,868,252

APPARATUS FOR AND PROCESS OF REMOVING SKINS FROM TOMATOES

Richard C. Boucher, Bryan, Ohio

Application December 20, 1955, Serial No. 554,159

2 Claims. (Cl. 146—46)

The invention is directed to a process for removing the skins from tomatoes and apparatus for performing the process.

It is recognized that various attempts have been made to remove the skins from tomatoes. For example, the most common process is to place the tomatoes in hot water bath or carry them through a steam tunnel until the skins are loosened, after which the tomatoes are removed so that the skins can be peeled off by hand. The hand peeling of such skins is a time consuming, laborious and messy job and has not proven entirely satisfactory under all operating conditions because the tomatoes to be conditioned vary considerably.

Other processes have also been employed without satisfactory results and the various machines utilized in conjunction therewith have been very expensive, complicated and intricate and in some respects, dangerous to operate.

With the foregoing in mind, one of the principal objects of the invention is to provide a novel process of removing the skins from tomatoes, similar fruits or vegetables, which consists in applying an acetylene oxygen flame of a temperature approximately 5850 degrees Fahrenheit to a tomato for a period sufficient to carbonize the skin and instantly form steam under the carbonized particles of skin, blowing off some of the particles to leave a minimum of residue, removing the residue, and then cutting the core from the tomato.

An important object of the invention is to provide apparatus for practicing the process, comprising, among other things, a frame, a conveyor provided with supports for tomatoes, a device for projecting a controlled flame, guide means for imparting movement to the supports to position the tomatoes individually in the flame, means for moving the flame projector device for travel along with each support so that each tomato will be subjected to the flame for a predetermined period sufficient to carbonize the skin and instantly form steam under the carbonized particles, which leaves a residue, and means for brushing and washing the residue from the tomato.

A particular object of the invention is to construct the tomato supports so that they are tilted or normally positioned at an angle with referecne to the horizontal to facilitate manual fastening of the tomatoes to the supports.

A specific object of the invention is to design and construct the tomato supports and the guide means above referred to in such a manner that when a support engages the guide means the support will be simultaneously rotated and moved to an erect or vertical position so that the tomato is presented to the flame and brushing assembly.

Another object of the invention is to provide a flame projector having a plurality of individual nozzles which can readily adjust to place the flames emanating therefrom in conforming relationship to a tomato and so that preferably more than half of its surface area will at all times be subjected to the flames while the tomato is rotating with its support.

Another object of the invention is to provide improved means for controlling the operation and reciprocal or longitudinal movement of the flame projector device.

A significant object of the invention is to provide a unique setup for brushing and washing the residue from the tomatoes.

Other attributes of the apparatus, embodying the invention, resides in its automatic and positive acting features of operation, and the speed and efficient way the skins are removed without damaging the body of the tomato.

Many other objects and advantages of the invention will become evident after the description hereinafter set forth is considered in conjunction with the drawings annexed hereto.

In the drawings:

Figure 1 is a top plan view of the apparatus;

Figure 2 is an elevational front view of the structure shown in Figure 1, with portions in section to illustrate details of construction;

Figure 3 is an elevational front view of the apparatus;

Figure 4 is an elevational end view showing other details of construction, including a supply tank for the gas employed in the flame projector;

Figure 5 is a transverse sectional view taken through the upper part of the apparatus showing the operative relationship between the flame projector and a tomato support;

Figure 6 is a sectional view showing part of the structure employed for controlling movement of the flame projector;

Figure 7 is an elevational front view of the structure illustrated in Figure 6;

Figure 8 is a partial perspective view of the flame projector and the guide means employed for actuating or imparting movement to the tomato supports;

Figure 9 is a top plan view of a tomato support mounted on the conveyor;

Figure 10 is a transverse sectional view showing a tomato support supported on the conveyor and the latter on the frame, including the manner in which each tomato support is actuated by the guide means;

Figure 12:
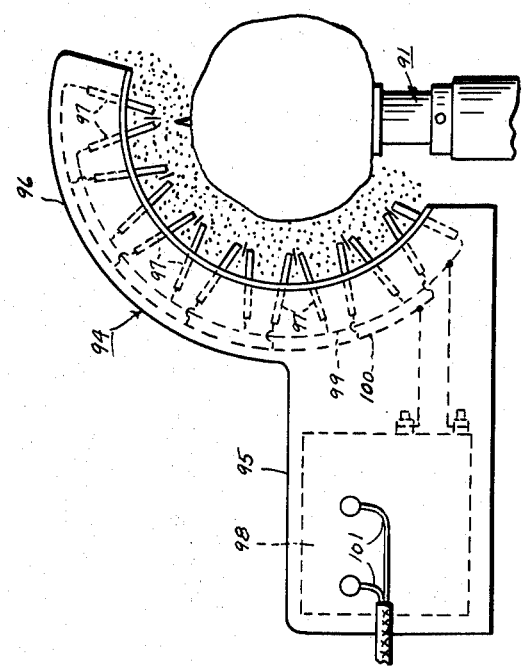
Figure 12 is an enlarged partial elevational view clearly exemplifying the application of the arc means.

Referring more particularly to the apparatus exemplified in Figures 1, 2 and 3 of the drawings, numeral 1 generally designates a frame; 2 a conveyor; 3 a plurality of individual supports for tomatoes; guide means 4 for controlling the movement of the tomato supports; a flame projector device 5; a brushing and washer assembly 6 and driving means 7 for transmitting movement to the conveyor.

The frame 1 is generally rectangular and mounted on four legs. The frame includes parallel side walls 8 and end walls. As shown in Figures 2, 3 and 4, a pair of legs at one end of the apparatus carry the driving means 7 in the form of an electric motor. A speed reducing assembly 9 is operatively connected to the motor and to the conveyor 2 by a plurality of belts and pulleys. It is to be understood that driving means other than an electric motor may be employed to transmit motion ot the conveyor and that such means may be located remote from the apparatus as distinguished from being directly supported thereon.

As clearly shown in Figures 5, 8 and 10 of the drawings, a pair of corresponding longitudinal track members 10 are mounted within the confines of the rectangular frame in horizontal positions slightly below inturned top wall portions 11 of the frame or housing. Each of the tracks is preferably made in the form of a metal strip having a depending portion which is secured to a side wall of the housing and a horizontal portion having a rib thereon on which the conveyor slides.

The conveyor 2 may be designed and constructed as desired, and, as herein illustrated, is comprised of a pair of corresponding endless chains mounted on sprockets. More specifically in this regard, a driven shaft 12 is rotatably supported in bearings carried by the side walls 8 adjacent one extremity of the frame. This shaft, among other things, carries a pair of sprockets 13 and 14 and a pulley 15, the latter of which is operatively connected to a shaft of the speed reducer assembly 9 by a belt 16. Another shaft 17 is rotatably supported adjacent the other extremity of the frame 1 and this shaft carries a pair of sprockets 18 and 19 of a size corresponding to the sprockets 13 and 14. One of the chains is mounted on the sprockets 13 and 19 and the other chain is mounted on the sprockets 14 and 18.

As shown in Figures 1, 2 and 3, the shaft 17 is carried by a slidable member 20 mounted on inturned rest portions 21 of the frame below its top walls 11. The member 20 is guided by the top walls 11 and inturned portions 21 and is provided with threaded rods 22 extending through holes provided therefor in an end wall of the frame with nuts 23 on the rods to facilitate tensioning adjustment of the endless chains for proper operation and so that portions of the chain will ride on the tracks 10 to maintain the tomato supports 3 thereabove in a level position in order that the tomatoes will be subjected to the flame of the flame projector 5 and the brushing and washer assembly 6.

The supports 3 which carry the tomatoes are novel in design and construction and will now be described. As best exemplified in Figures 5, 9 and 10, each support, among other things, includes an elongated rectangular mounting plate 24 having angular end fittings for detachably connecting the mounting plate in a horizontal crosswise position to opposed cross-links of the chains. These plates are connected to the chains about six inches apart and assist in maintaining the chains in spaced apart parallel relationship. Each mounting plate is provided with an elongated opening 25 and bearings 26 are detachably connected to longitudinal side portions of the plate. A tubular member 27 is disposed upright and transversely in each of the openings 25 and each member is provided with pintles 28 and 29 which are journalled in the bearings 26.

A shaft 30 is rotatably mounted in each tubular member. The lower end of each shaft is provided with a knurled round head 31 and its upper extremity is provided with a collar 32 to hold the shaft in a predetermined rotary position in the member. The outer extremity of each shaft is also provided with a round flat rest 33, a center spindle 34 extending axially outwardly from the shaft and rest, and a pair of diametrically disposed corresponding pins 35, shorter than the spindle, which are carried by the rest and extend in axial parallel relation to the spindle.

The pintle 29 is preferably made longer than the pintle 28 and carries a lever 36. One end of a helical spring 37 is detachably connected to the outer end of the lever and its other end is preferably attached to the mounting plate 24 so that the tubular member 27 and shaft 30 of each tomato support as a unit is normally held at a tilted or inclined position by the spring as clearly shown in Figure 10. The tomato supports are individually operable and each support or holder is preferably mounted in the normal inclined position referred to so as to facilitate fastening a tomato on the spindle 34 and pins 35. More particularly in this respect, the supports are inclined away from an operator standing in front of the apparatus so that the operator can more readily visualize how the tomatoes should be fastened on the spindles and pins. The spindle 34 is adapted to pierce the core or stem end of the tomato and the pins stuck therein serve to prevent rotation of the tomato on its support.

The guide means 4 is preferably made in the form of an elongated bar which is secured to a pair of cross-members 38 located below the tracks 10 as shown in Figures 5, 8 and 10 to place an inner straight edge 39 of the bar in the path of the knurled heads 31 on the shafts 30 of the tomato supports. The left end of the bar, as viewed in Figure 8, is upturned and curved to form a curved cam edge 40 constituting a continuation of the edge 39. The arrangement is such that as the head 31 of each support engages the cam edge, the support will be simultaneously rotated and moved to an erect or vertical position and this vertical position of each support will be maintained while its head is held engaged with the straight edge 39 by the spring 37 to locate the tomato on the support for treatment by the flame projector and the brushing and washer assembly. When the head of each support leaves the guiding edge 39, the tension spring will automatically cause the support to swing back to its normal inclined position, as shown in Figure 2 of the drawing.

The flame projector device 5 is mounted for travel for a predetermined distance, approximately five inches, along with each support and tomato and is then quickly automatically moved back to the next support or tomato with which it travels the same distance. The aforesaid distance of five inches may obviously be varied. This operation or reciprocatory movement of the flame projector is continuous and the relationship between the knurled head 31 of each shaft 30 and the guide means 4 is preferably such that each shaft and tomato carried thereby makes one revolution as they travel the aforesaid distance so that the entire surface area of each tomato is completely subjected to the burning action of the flame of the projector and the brushing and washer assembly 6.

The flame projector 5 may be designed and constructed and mounted in various ways but as depicted in Figures 1, 5, and 8, the projector includes an upright manifold 41 attached to a pair of cylindrical rods 42 mounted in a pair of longitudinally spaced transverse bearings 43 through which they slide. The bearings are attached to a mounting plate 44 which in turn is secured to one of the top walls 11 of the frame 1 so that the rods are located above the frame and in parallel relation to the conveyor and tracks. The rods are connected together by end members 45 and 46.

The manifold 41 is provided with a plurality of flexible conduits 47, preferably six in number, and each conduit carries a nozzle 48. A flexible supply line conduit 49 is connected to a tank 50 and the manifold for feeding gas to the manifold from which it passes out through the nozzles. Attention is directed to the fact that the flexible conduits 47 and nozzles 48 carried thereby are so designed and constructed that they may be manually adjusted to place the flames in conforming relationship to a tomato to preferably cover more than one half of the surface area of the tomato. The nozzles may be adjusted as desired but, as shown in Figures 5 and 8, are preferably manually arranged in an arcuate relationship in a vertical plane.

The means employed for actuating the flame projector device will now be described. As shown in Figures 3, 6 and 7 a shaft 51 is mounted on the front side wall 8 of the housing and carries a sprocket 52 and a propeller like cam 53 having alternately disposed corresponding curved cam surfaces 54 and 55. An elongated lever 56 has its lower end pivoted at 57 to a fitting on one of the side walls and a link 58 is connected to the upper end of the lever and to the end member 45 joining the slidable rods 42. A spring 59 has one end connected at 60 to the said side wall and its other end to the lever at 61 so as to normally urge the lever and flame device to the right as viewed in Figures 3 and 7. The lever, as shown in Figures 6 and 7, is provided with a roller 62 for alternate engagement with the cam surfaces 54 and 55.

The driven shaft 12, operatively connected to the speed reducer assembly 9, extends outwardly from the frame 1 and is provided with a sprocket 63 and a fly wheel pulley 64, as depicted in Figures 1, 2 and 3. A chain 65 operatively connects the sprockets 52 and 63 respectively carried by the shafts 51 and 12 for continuously rotating the cam 53 for timing the burner with the tomato support. In operation, rotation of the cam in a counter-clockwise direction as indicated by the arrow in Figure 7, will move the cam 54 to engage the roller 62 and thereby pivot the lever to the left and carry the flame projector 5 therewith until the cam surface 55 clears the roller, whereupon the spring 59 automatically and quickly swings the lever and flame projector back to the full line position in Figure 7, after which the projector is again caused to travel along with the next support and tomato thereon, which travel is initiated by the cam surface 54 engaging and riding on the roller 62 in the same manner that cam surface 55 engaged the roller. This reciprocatory movement of the projector is continuous while the apparatus is in operation and controls the period of time each tomato is subjected to the flame.

The brushing and washer assembly 6 is operatively associated with the means for actuating the flame projector. This assembly may be designed and constructed in various ways but as exemplified, includes three round brushes 66, 67 and 68 respectively carried by rear ends of parallel shafts 69, 70 and 71 journaled in spaced bearings 72 mounted on a plate 73 attached to rear top wall 11 of the frame or housing 1. The bristles of these brushes are disposed substantially horizontal for engaging the tomatoes as they travel alongside thereof. The rear ends of the shafts 69, 70 and 71 are respectively provided with relatively small pulleys 74, 75 and 76. A relatively long belt 77 is operatively connected to the fly wheel pulley 64 and the smaller pulleys with a portion of the belt overlying the outer pulleys 74 and 76 and underlying the center pulley 75 to rotate the outer brushes 66 and 68 counter-clockwise and the center brush 67 clockwise as viewed in Figure 3. This difference in the direction of the rotation of the brushes and the fact that each tomato is rotated while being subjected to the action of the bristles of three brushes has proven very efficient in removing all of the residue, particularly when assisted by the flushing action of water from a spray head 78 which projects a spray of some length downwardly onto the brushes and motatoes as shown in Figure 2. The spray head 78 is connected to a source of water by a pipe 79 as shown in Figure 4.

In order to further assist in removing any residue which may remain on each tomato, an additional rotary brush 80 is provided. This brush is mounted on a vertically disposed rotary shaft 81 so that the bristles of the brush are disposed vertically to engage an end of each tomato after the tomato passes alongside and in engagement with the brushes 66, 67 and 68. With this unique setup, three tomatoes are being respectively scrubbed by the brushes 66, 67 and 68, and a fourth tomato by the brush 80, while another tomato is being subjected to the flame. Each tomato after leaving the flame is subjected to the brushing action of the four brushes 66, 67, 68 and 80.

The rotary shaft 81 which supports the brush 80 is preferably mounted in an upstanding bracket 82, carried by the frame as shown in Figures 3 and 4. The upper end of the shaft 81 carries a pulley 83. The bracket also supports a vertical rotary shaft 84 which carries a pulley 85 at its upper end, which pulley is operatively connected to the pulley 83 by a belt 86. A gear 87 on the lower end of shaft 84 meshes with a gear 88 on the drive shaft 12, as depicted in Figure 4, for imparting rotation to the brush 80 through the aforesaid components. After each tomato passes the brush 80, it is removed from its support and laid on a chute 89 for discharge onto a conveyor when the core of the tomato can be readily removed by an operator.

Figure 11:
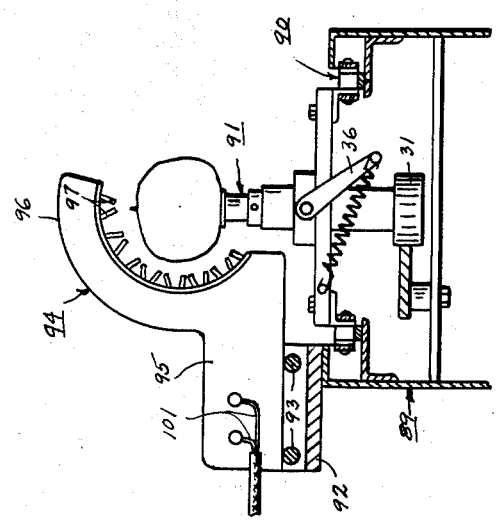
Figure 11 is a vertical section taken through a modified structure in which electric arc means are utilized to substantially remove skins of tomatoes.

The modified structure embodying the arc means and exemplified in Figures 11 and 12 of the drawing will now be described. The structure, among other things, includes a frame 89, a chain conveyor 90 and tomato supports 91 carried by thse conveyor. A plate 92 is attached to the frame 89 and rods 93 are carried by the plate. A flame projecting device 94 is slidable mounted on the rods for actuation by a lever in the same manner that the lever 56 actuates the flame projector 5. The device 94 includes a generally rectangular body 95 having a formation 96 curved in an arc of substantially one hundred eighty degrees and so that a portion will overhang a tomato as illustrated. The arcuate formation 96 is provided with a plurality of pairs of carbon electrodes 97, preferably equally spaced apart and disposed in a single vertical plane. The electrodes in each pair are also disposed in a converging relationship so that their outer ends are closely associated to produce an arc in a conventional manner. The electrodes are removable for replacement purposes and one electrode of each pair is connected to a transformer 98 by a conductor 99, and the other electrode of each pair to the transformer by a conductor 100. The transformer, which is housed in the body 95, is adapted for connection with a source of power, not shown, by conductors 101. This modified structure has also proven efficient in producing a flame or flames of a temperature of approximately 12,000 degrees Fahrenheit for removing the skins from tomatoes.

With the foregoing in mind, attention is directed to the fact that the temperature of the flame of either device may be somewhat lower or higher than that stated but must be sufficient to substantially simultaneously char the skin and produce steam thereunder. This factor is important because the moisture directly under the skin is flashed into steam, and this steam blows charred particles of the skin from the tomato with considerable force, leaving the surface of the tomato slightly moist and with a small amount of residue thereon. The fact that the surface is slightly moist also greatly facilitates removal of the residue by the washing and/or brushing operation. Although the temperature is high, the tomato is warmed only on the surface. There is no injury or softening of the meat of the tomato as is experienced when tomatoes are subjected to a hot water bath or steam by the conventional methods above referred to. One reason for this is the very short period of time that the flame is applied to any one area or portion of the tomato. The time period is less than one second, but this period can be shortened depending upon the speed that an operator can place tomatoes upon the supports.

Experience has also determined that if too low a temperature is used, such as that derived from the combustion of natural gas and air, the skins are loosened only if the tomatoes are perfect in every respect and of just the proper degree of ripeness, but this flame still will not carbonize and blow off the residue as an oxygen acetylene flame does. The machine and/or process constituting the subject invention will remove the skins of tomatoes having varying degrees of ripeness, including those which are irregular in shape, cracked, cat faced or have yellow or green tops.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. Apparatus of the kind described comprising a frame, a conveyor movable on the frame, a support for a tomato mounted on the conveyor for rotary and tiltable movement, means for normally urging the support to a tilted position with respect to the conveyor, a flame projector mounted for reciprocating movement with respect to the frame, elongated abutment means on the frame engageable with the support for rotating and moving the support from a tilted position to an erect position as it approaches the projector during travel of the conveyor in one direction, means for moving the projector from a starting position in the same direction as the conveyor and substantially at the same rate of speed for a predetermined distance so that a tomato adapted to be carried by the support will be subjected to a flame adapted to emanate from the projector, means for returning the projector back to its starting position after it has traveled said distance, and said urging means being operable to move the support back to an inclined position after the support leaves the abutment means on said frame.

2. Apparatus of the kind described comprising a frame provided with parallel tracks, an endless conveyor movable on the tracks, a spindle support mounted on the conveyor for rotary and tiltable movement, pins on the support for securing a tomato against rotation on the support, means for normally maintaining the support in a tilted position with respect to the conveyor, a flame projector mounted on the frame and above the conveyor for reciprocating movement, elongated abutment means on the frame below the projector and engageable with the lower extremity of the support for rotating and moving the support from a tilted position to an erect position as it approaches the projector during travel of the conveyor in one direction, means for moving the projector in the same direction as the conveyor and substantially at the same rate of speed as the latter for a predetermined distance so that a tomato adapted to be carried by the support and for connection with the pins will be subjected to a flame adapted to emanate from the projector, means for returning the projector back to its tilted position after it has traveled said distance, and said means for normally maintaining the support in said tilted position being active for such purpose after the support leaves the abutment means on said frame.

References Cited in the file of this patent

UNITED STATES PATENTS

| | | |
|---|---|---|
| 175,068 | Gillen | Mar. 21, 1876 |
| 719,616 | Scovill | Feb. 3, 1903 |
| 719,617 | Scovill | Feb. 3, 1903 |
| 1,236,690 | Dunkley | Aug. 14, 1917 |
| 1,250,140 | Chapman | Dec. 18, 1917 |
| 1,647,872 | Leavitt | Nov. 1, 1927 |
| 1,854,850 | Linkenauger | Apr. 19, 1932 |
| 1,984,237 | Southan | Dec. 11, 1934 |
| 2,159,318 | Carter | May 23, 1939 |
| 2,218,466 | Gray et al. | Oct. 15, 1940 |
| 2,247,602 | Carroll | July 1, 1941 |
| 2,283,290 | Savage | May 19, 1942 |
| 2,331,014 | Brown | Oct. 5, 1943 |